May 20, 1969  E. VON WASIELEWSKI ET AL  3,444,794
IMPELLER SHUTTER FOR PHOTOGRAPHIC CAMERA
Filed March 28, 1967  Sheet 1 of 3
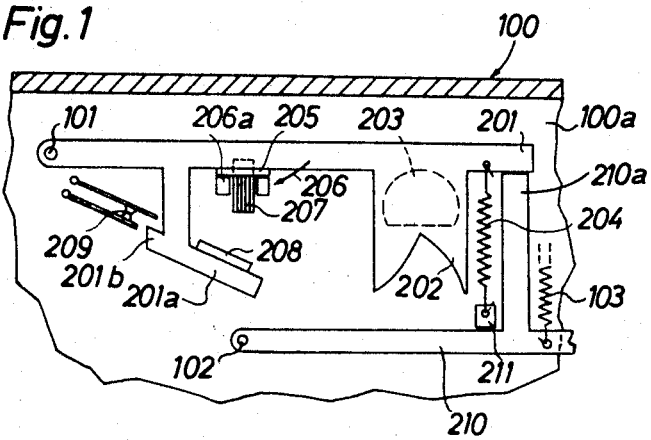
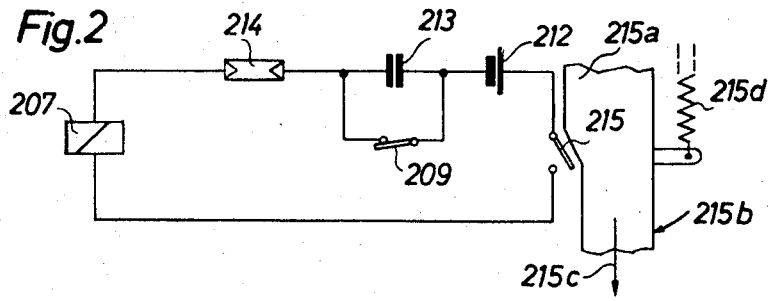
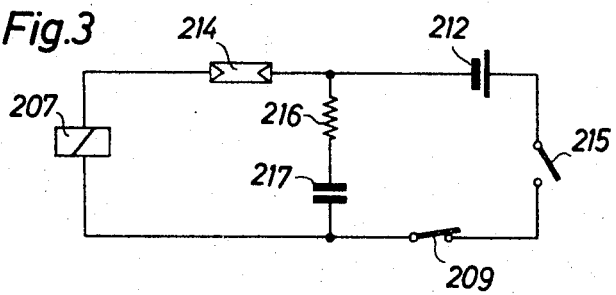
INVENTORS:
ERWIN v. WASIELEWSKI
KARL-HEINZ HANDWERK
BY Michael S. Striker
Attorney May 20, 1969    E. VON WASIELEWSKI ET AL    3,444,794
IMPELLER SHUTTER FOR PHOTOGRAPHIC CAMERA
Filed March 28, 1967          Sheet 2 of 3
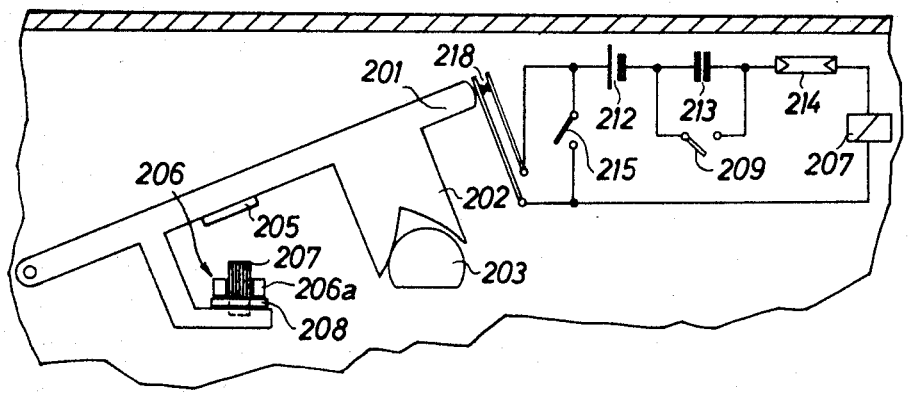
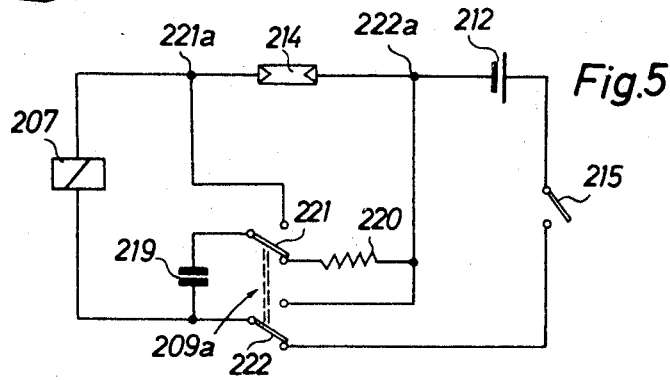
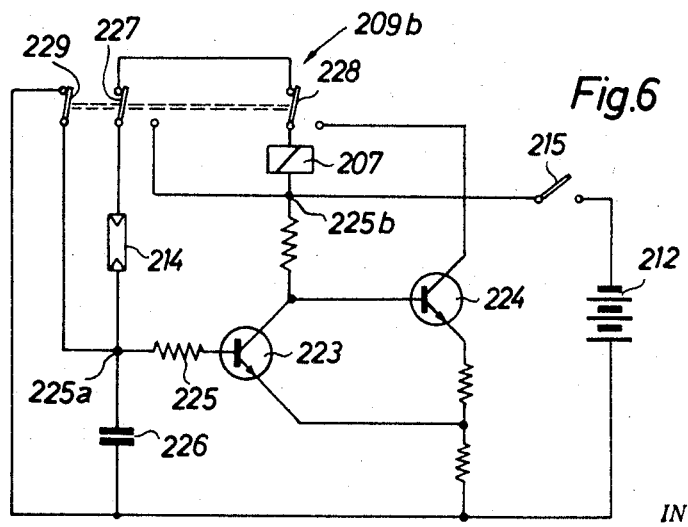
INVENTORS:
ERWIN v. WASIELEWSKI
BY KARL-HEINZ HANDWERK
Michael S. Striker
Attorney United States Patent Office 3,444,794
Patented May 20, 1969

3,444,794
IMPELLER SHUTTER FOR PHOTOGRAPHIC CAMERA
Erwin von Wasielewski and Karl-Heinz Handwerk, Munich, Germany, assignors to AGFA-Gevaert Aktiengesellschaft, Leverkusen, Germany
Filed Mar. 28, 1967, Ser. No. 626,477
Claims priority, application Germany, Apr. 1, 1966,
A 52,043
Int. Cl. G01j 1/32
U.S. Cl. 95—10          24 Claims

ABSTRACT OF THE DISCLOSURE

Photographic camera wherein the shutter determines the exposure time and the effective size of the diaphragm opening. The shutter is moved from closed to open position against the bias of a spring in response to impetus received from an impeller which is cocked and released in response to actuation of a shutter release trigger. A first retard unit controls the exposure time and the size of the opening when the intensity of scene light is high. If the intensity of scene light is low, a second retard unit takes over and determines the exposure time as a function of scene brightness by maintaining the shutter in fully open position in which the size of the diaphragm opening assumes a maximum value.

Cross-reference to related application

Our invention is concerned with improvements in cameras disclosed in copending application Ser. No. 531,835 filed on Mar. 4, 1966 by Erwin von Wasielewski for "Exposure Control Device for Photographic Cameras" and assigned to the same assignee.

Background of the invention

The present invention relates to photographic cameras in general, and more particularly to improvements in shutters for photographic cameras. Still more particularly, the invention relates to improvements in cameras of the type wherein the shutter opens in response to impetus received from an impeller which is cocked and released in response to actuation of a shutter release trigger.

The cameras which is disclosed in the aforementioned copending application Ser. No. 531,835 comprises a shutter wherein one or more blades are moved to open position by an impeller. Movement of the shutter blade or blades back to closed position is caused by one or more return springs and the exposure time is a function of the force with which one or more electromagnets oppose movement of the shutter blade or blades to open position. Such shutters are quite satisfactory when the exposure time is short, i.e., when the intensity of scene light is high.

It is an object of our present invention to provide a photographic camera wherein the shutter opens in response to impetus received from an impeller and wherein such shutter can furnish very short as well as very long exposure times so that the camera will make satisfactory exposures of strongly or weakly illuminated subjects or scenes.

Another object of the invention is to provide a novel electrically operated shutter for use in still cameras and in other types of photographic cameras.

A further object of the invention is to provide an electric circuit for a shutter of the above outlined character and to assemble the circuit in such a way that its components consume little electrical energy, that the components can be installed in a compact camera housing, and that the exposure time will invariably depend on the intensity of scene light.

An additional object of the invention is to provide a shutter which opens in response to the impetus received from an impeller and can furnish exposure times which are longer than those determined solely by the mass of moving parts and/or the bias of one or more return springs which tend to maintain such movable parts in closed position.

Summary of the invention

Our invention resides in the provision of a photographic camera which comprises diaphragm means defining an opening, shutter means movable between open and closed positions to thereby respectively expose and conceal the opening, impeller means operative to propel the shutter means from closed toward a fully open position, return means for biasing the shutter means to closed position, and a plurality of retard means for delaying return movement of shutter means to closed position as a function of scene brightness. One of the retard means is effective when the intensity of scene light is high, and at least one additional or other retard means is effective when the intensity of scene light is low i.e., when the first retard means has permitted a predetermined displacement of shutter means from closed position.

The one or first retard means preferably comprises electric circuit means including an electromagnet which is energizable in response to operation of the impeller means and light-sensitive means for controlling energization of the electromagnet as a function of scene brightness so that the strength of the magnetic field of the electromagnet is proportional to scene brightness. The shutter means comprises a magnetizable portion which is attracted by the electromagnet with a force proportional to the strength of the magnetic field, i.e., the force produced by the electromagnet to oppose the impetus transmitted by the impeller means will be greater if the intensity of scene light is higher so that the displacement of shutter means from closed position will be smaller and of shorter duration.

When the force of the electromagnet is relatively weak so that the shutter means is displaced through a predetermined distance from its closed position, the other retard means takes over and prevents return movement of shutter means to closed position for an interval of time which is again a function of scene brightness. Such second retard means may comprise a capacitor which discharges through the coil of the electromagnet in response to a predetermined displacement of the shutter means from closed position and a second magnetizable portion on the shutter means which is then attracted by the electromagnet to hold the shutter means in fully open position in which the effective size of the diaphragm opening is at a maximum value. The two magnetizable portions of the shutter means may but need not be distinct; for example, the second retard means may comprise a second electromagnet which is energized when the intensity of scene light is low and then attracts that portion of the shutter means which is attracted by the first mentioned electromagnet during an exposure when the intensity of scene light is high.

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawing.

Brief description of the drawing

FIG. 1 is a fragmentary sectional view of a camera which embodies one form of our invention and wherein the shutter means can be propelled to open posi.ion in response to impetus transmitted by spring-biased impeller means;

FIG. 2 illustrates the electric circuit of two retard means for the shutter means of the camera shown in FIG.1;

FIG. 3 illustrates a modified circuit;

FIG. 4 illustrates a portion of a further camera and the circuit for its shutter means;

FIG. 5 illustrates a further circuit;

FIG 6 illustrates still another circuit;

Description of the preferred embodiments

Figure 7:
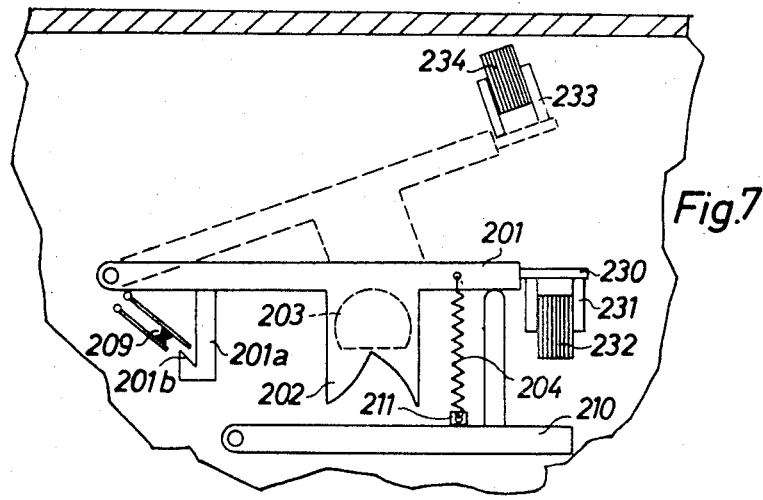
FIG. 7 is a fragmentary sectional view of another camera.

Referring first to FIG. 1, there is shown a portion of a photographic camera having a housing 100 containing a diaphragm member 100a provided with an opening 203 which is adapted to admit light from the scene to an unexposed film frame. The housing 100 accommodates shutter means including a shutter blade or sector 202 provided on an arm 201 which is rockable on a pivot pin 101. A return spring 204 tends to turn the arm 201 in a clockwise direction (as viewed in FIG. 1) and to maintain the shutter blade 202 in closed position in which the blade overlies and fully conceals the diaphragm opening 203.

The camera further comprises an impeller 210 which is pivotable on a pin 102 and has an extension 210a adapted to propel the arm 201 of the shutter means in a counterclockwise direction in order to move the blade 202 out of registry with the opening 203. The operation of the impeller 210 is fully described in the aforementioned application Ser. No. 531,835. This impeller is biased by a driving spring 103 which tends to maintain it in abutment with a fixed stop 211. The extension 210a then abuts against the arm 201 and causes slight expansion of the return spring 204, i.e., the shutter blade 202 is maintained only slightly above its lower end position. If the operator thereupon depresses a shutter release trigger 215b against the opposition of a return spring 215d (see FIG. 2), a pawl (not shown) on the trigger 215b rocks the impeller 210 in a counterclockwise direction so that the driving spring 103 stores energy and the return spring 204 can move the blade 202 to its lower end position. The pawl on the trigger 215b automatically releases the impeller 210 in a predetermined angular position whereby the driving spring 103 is free to contract and propels the entension 210a against the arm 201 so that the blade 202 turns about the pivot pin 101 and exposes a smaller or larger portion of the opening 203.

The arm 201 carries a small plate or portion 205 of magnetizable material which can move into abutment with the core 206a of an electromagnet 206 when the shutter release trigger 215b causes the entension 210a of the impeller 210 to leave the upper end position of FIG. 1. The coil of the electromagnet 206 is shown at 207.

The arm 201 is provided with a projection or branch 201a for a second plate or portion 208 of magnetizable material. The plate 208 approaches the coil 207 of the electromagnet 206 when the extension 210a of the impeller 210 transmits to the arm 201 an impetus which causes the arm to turn in a counterclockwise direction. The core 206a or another part of the electromagnet 206 can arrest the plate 208 to thus determine the maximum effective size of the diaphragm opening 203 and to maintain the shutter means 201, 202 in fully open position.

The projection 201a has a tooth 201b which constitutes an actuating member or trip for a normally closed control switch 209. When the plate 208 approaches the electromagnet 206, the trip 201b automatically opens the control switch 209, i.e., the control switch opens before the electromagnet 206 prevents further upward movement of the shutter blade 202. The control switch 209 is stationary and is affixed to the housing 100 or to a suitable carrier which is installed in the housing.

As stated before, the extension 210a maintains the plate 205 at a slight distance from the core 206a of the electromagnet 206 when the impeller 210 abuts against the stop 211. The latter can simultaneously serve as a fixed retainer for one end of the return spring 204.

FIG. 2 illustrates the electric circuit in the camera of FIG. 1. This circuit determines the exposure time and also the effective size of the diaphragm opening 203. The coil 207 of the electromagnet 206 is connected in series with a light-sensitive resistor element 214, a capacitor 213, a battery 212 or another suitable source of electrical energy, and a normally open master switch 215. The control switch 209 is connected in parallel with the capacitor 213. The master switch 215 can be closed by a trip 215a which can form an integral part of the shutter release trigger 215b and closes the switch 215 in automatic response to depression of the trigger (arrow 215c), such depression resulting in movement of the impeller 210 away from the fixed stop 211. As stated before, the control switch 209 is normally closed so that the electric circuit of FIG. 2 is completed as soon as the operator causes the trip 215a to close the master switch 215.

The operation is as follows:

When the return spring 215d maintains the shutter release trigger 215b in starting or idle position, the master switch 215 is open and the control switch 209 is closed. The electromagnet 206 is deenergized and the shutter blade 202 overlies and fully conceals the diaphragm opening 203. The extension 210a abuts against the arm 201 and the plate 205 is maintained at a slight distance from the core 206a. The impeller 210 is held in uncocked position and abuts against the stop 211.

If the user wishes to make an exposure, the trigger 215b is depressed (arrow 215c) to rock the impeller 210 in a clockwise direction, as viewed in FIG. 1. The spring 204 immediately moves the plate 205 into actual abutment with the core 206a to thus place the arm 201 into the range of the extension 210a. Also, the trip 215a closes the master switch 215 so that the circuit of the electromagnet 206 is completed and the electromagnet is energized. The core 206a attracts the plate 205 with a force which is a function of the intensity of scene light i.e., the strength of the magnetic field of the electromagnet 206 depends on the resistance of the light-sensitive element 214. Such resistance decreases in response to increasing scene brightness, i.e., the strength of the magnetic field is proportional to scene brightness.

The user continues to depress the trigger 215b whereby the impeller 210 assumes its fully cocked position and is automatically released by the aforementioned pawl so that it can follow the bias of the driving spring 103 and turns in a counterclockwise direction to return into abutment with the stop 211. During the last stage of its return movement to uncocked position, the extension 210a strikes against the arm 201 and propels the latter in a counterclockwise direction against the opposition of the return spring 204 and against the force exerted by the electromagnet 206 to attract the plate 205. If the intensity of scene light is high, i.e., if the resistance of the light-sensitive element 214 is low, the field of the electromagnet 206 (combined with the bias of the spring 204) offers to the impetus produced by the extension 210a a resistance which is high enough to rapidly return the blade 202 to the position of FIG. 1, i.e., the exposure time will be very short and the effective size of the diaphragm opening 203 will be small because the angular movement of arm 201 in a counterclockwise direction is terminated before the blade 202 exposes the entire opening 203. The trip 201b will fail to open the control switch 209 if the resistance of the light-sensitive element 214 is low so that the circuit of the coil 207 remains completed until after the trip 215a moves away from the master switch 215.

However, when the user wishes to take a picture of a dimly lit subject or scene, the resistance of the light-sensitive element 214 is so high that the attracting force of the electromagnet 206 is weak and the impetus transmitted to the arm 201 in response to counterclockwise rotation of the extension 210a is strong enough to move the trip 210b through an angle which suffices to open the control switch 209. The current cannot bypass the capacitor 213 via control switch 209 so that the impetus transmitted to the arm 201 suffices to move the plate 208 into actual abutment with the electromagnet 206. In such angular position of the arm 201, the shutter blade 202 exposes a substantial part of or the entire diaphragm opening 203. The electromagnet 206 attracts the plate 208 and holds the blade 202 in fully open position against the opposition of the return spring 204.

During a short interval immediately following the opening of control switch 209, the light-sensitive element 214 continues to conduct current at a rate which is a function of scene brightness. The strength of the current decreases in response to charging of the capacitor 213. After a certain interval of time whose length depends on the scene brightness, the flow of current through the coil 207 of the electromagnet 206 decreases to such an extent that the bias of the spring 204 overcomes the force with which the electromagnet attracts the plate 208 so that the arm 201 turns in a clockwise direction and comes to a halt when it reaches the tip of the extension 210a. The trip 201b moves away from the movable contact of the control switch 209 so that the latter closes. This terminates the exposure because the shutter release trigger 215b has been returned to idle position (by spring 215d) prior to such deenergization of the electromagnet 206 that the spring 204 is free to contract.

The action of the capacitor 213 can be influenced by conventional means, for example, by resistors which are connected in series and/or in parallel, by hot or cold conductors, or by other electrical components of conventional design. Such adjustments of the capacitor 213 will be necessary to compensate for changes in temperature and to thus insure that the exposure time will be an accurate function of scene brightness.

A very important advantage of the aforedescribed camera is seen to reside in that a single electromagnet (206) suffices to achieve relatively short or relatively long exposure times and that the selection of exposure time is fully automatic, i.e., that the user need not carry out any additional steps for the sole purpose of insuring that the exposure time will be an accurate function of scene brightness when the intensity of light impinging against the light-sensitive resistor element 214 is low.

In the circuit of FIG. 2, the first retard means includes the parts 205, 207, 212, 214 and 215. This retard means determines the effective size of the diaphragm opening 203 and the exposure time when the intensity of scene light is high. The second retard means includes the parts 208, 209, 213 and takes over to determine the effective size of the opening 203 and the exposure time when the intensity of scene light is low, i.e., when the impeller 210 has caused the shutter means 201, 202 to cover a predetermined distance on its way from closed toward fully open position. Such predetermined distance is covered by the shutter means 201, 202 when the trip 201b actuates and opens the control switch 209 of the second retard means. It will be noted that the second retard means controls the effective size of the diaphragm opening 203 and the exposure time through the intermediary of certain parts of the first retard means, such as the light-sensitive resistor element 214 and electromagnet 206.

FIG. 3 illustrates the electric circuit of a second photographic camera. The numerals 207, 209, 212, 214 and 215 of FIG. 3 denote parts which are also shown in FIG. 2. The second retard means of this circuit comprises the control switch 209 and an R-C unit including a fixed resistor 216 in series with a capacitor 217. The R-C unit is connected in parallel with the light-sensitive resistor element 214 and coil 207 of the electromagnet 206. The control switch 209 is connected between the master switch 215 and one plate of the capacitor 217.

The operation of the camera which embodies the circuit of FIG. 3 is as follows:

When the shutter release trigger 215b (not shown in FIG. 3) is idle, the master switch 215 is open but the control switch 209 is closed. The master switch 215 is closed by the trip 215a in the same way as described in connection with FIG. 2, i.e., immediately after the operator begins to depress the shutter release trigger 215b. The circuit of the coil 207 is then completed and the capacitor 217 is charged through the resistor 216 to the potential of the battery 212. If the intensity of scene light is high, the resistance of the light-sensitive element 214 is low and the electromagnet (coil 207) attracts the magnetizable plate 205 with a considerable force so that the effective size of the diaphragm opening 203 will be small and the exposure time will be short. However, if the intensity of scene light is low, the trip 201b opens the control switch 209 of FIG. 3 in the same way and for the same reasons as described in connection with FIGS. 1 and 2. The control switch 209 then interrupts the flow of current from the battery 212 to the coil 207. However, the capacitor 217 discharges through the resistor element 214 and enables the electromagnet 206 to attract the plate 208 (see FIG. 1) with a force which suffices to overcome the bias of the return spring 204. When the discharge current of the capacitor 217 is sufficiently weak, the return spring 204 contracts and returns the shutter blade 202 into full registry with the diaphragm opening 203.

FIG. 4 illustrates a portion of a third camera which is similar to the camera of FIGS. 1 and 2. Its electric circuit is shown in the right-hand part of FIG. 4 and the trip (corresponding to the trip 201b of FIG. 1) has been omitted, together with the return spring 204 and impeller 210. The coil 207 is shown twice, namely in the electromagnet 206 and again in circuit with the remaining electrical components including the normally open master switch 215, capacitor 213, battery 212, light-sensitive resistor element 214, normally closed control switch 209 and a normally open further switch 218 (hereinafter called delay switch) which is connected in parallel with the master switch 215. The function of the delay switch 218 is to prevent premature deenergization of the electromagnet 206. In other words, the electromagnet 206 can continue to attract the plate 208 and to maintain the shutter blade 202 in fully open position after the shutter release trigger 215b (not shown in FIG. 4) allows the master switch 215 to open, as long as the electromagnet 206 attracts the plate 208 with a force which is strong enough to overcome the bias of the return spring 204.

FIG. 4 illustrates the parts of the camera in positions they assume during an exposure when the intensity of scene light is weak. The delay switch 218 is closed by the arm 201; however, it can also be closed by the blade 202 or by any suitable trip means which is arranged to move with or in response to movement of the blade 202 toward open position. The arrangement is such that the arm 201 closes the delay switch 218 only when the intensity of scene light is so weak that the impetus transmitted to the arm 201 by impeller 210 suffices to effect opening of control switch 209 by the trip 207b or by any other part which moves with or in response to movement of the shutter blade 202 through an angle of predetermined magnitude. In other words, the switch 218 can close simultaneously with opening of the control switch 209 in response to a predetermined displacement of the shutter means 201, 202 from closed position.

In the camera of FIG. 4, the length of exposure time is independent of the position of the master switch 215 as soon as the delay switch 218 closes, i.e., whenever the intensity of scene light is so low that the arm 201 can close the switch 218. The electromagnet 206 then attracts the plate 208 as long as it can overcome the bias of the return spring 204, irrespective of whether or not the shutter release trigger 215b was allowed to reassume its idle position. When the intensity of scene light is high, the delay switch 218 remains open and the camera will make an exposure in the same way as described in connection with FIGS. 1 and 2, i.e., the effective size of the diaphragm opening and the exposure time will be determined solely by the first retard means 205, 206, 212, 214, 215. In this embodiment of our invention the second retard means includes the parts 208, 209, 213 and 218.

Referring now to FIG. 5, there is shown a further electric circuit which can control the shutter means 201, 202 of FIG. 1. An important feature of this circuit is that, when the shutter means is to furnish a longer exposure time, the current need not flow through the light-sensitive resistor element 214. Under such circumstances (long exposure time), a current of full strength can flow through a two-way control switch 209a which replaces the control switch 209 of FIG. 1 but can be actuated in the same way, for example, by the trip 201b on a projection 201a of the arm 201 (see FIG. 1). When the two-way switch 209a is free to assume its normal position, its contact 222 connects one plate of a capacitor 219 with one pole of the battery 212 (through the master switch 215). The other plate of the capacitor 219 is connected with the other pole of the battery 212 through the contact 221 of the control switch 209a and a fixed resistor 220. When the two-way control switch 209a is caused to change its position (because the intensity of scene light is low), its contact 222 connects the one plate of the capacitor 219 with the other pole of the battery 212 through a tap 222a between the battery and the resistor element 214, and the other plate of the capacitor 219 is connected by contact 221 with a tap 221a between the resistor element 214 and coil 207. The capacitor 219 will be charged when the exposure time is short, i.e., when the angular displacement of the trip 201b (see FIG. 1) is not sufficient to actuate the control switch 209a and the contacts 221, 222 remain in the positions shown in FIG. 5. The current for the coil 207 flows directly through the light-sensitive element 214 whose resistance is low. Upon completion of the exposure (the length of the exposure time is not influenced by the capacitor 219 when the exposure time is short), the capacitor 219 discharges through the resistor 220, light-sensitive element 214 and coil 207.

When the exposure time is long, the contacts 221, 222 of the control switch 209a leave the positions shown in FIG. 5 so that the light-sensitive element 214 is connected in parallel with the coil 207 and is located in the discharge circuit of the capacitor 219. The force with which the electromagnet 206 (coil 207) attracts the plate 208 (see FIG. 1) in fully open position of the shutter blade 202 suffices to resist the bias of the return spring 204. The exposure is terminated when the capacitor 219 completes its discharge through coil 207.

FIG. 6 shows the electric circuit of a further photographic camera. The second retard means of this circuit includes a pair of transistors 223, 224. The base of the transistor 223 is connected with a tap 225a between a capacitor 226 and a light-sensitive resistor element 214. The connection between the base of the transistor 223 and tap 225a contains a fixed resistor 225. The transistors 223, 224 constitute a switching stage or switching circuit whose control line connects the base of the transistor 223 with the tap 225a. The emitter of the transistor 223 is connected with a tap 225b between the coil 207 and the battery 212.

The second retard means further comprises a three-way control switch 209b having a third contact 229 and a pair of contacts 227, 228 which correspond to the contacts 221, 222 of the control switch 209a in FIG. 5. In the illustrated normal position of the control switch 209b (which corresponds to a setting of the shutter during an exposure with short exposure time), the light-sensitive resistor element 214 is connected in series with the coil 207 of the electromagnet 206 via contacts 227, 228. One end of the element 214 can be connected with one pole of the battery 212 via coil 207 and master switch 215. The other end of the element 214 is connected with the other pole of the battery 212 via third contact 229 (which is in parallel with the capacitor 226).

When the exposure time is long, i.e., when the impeller 210 of FIG. 1 has caused such angular displacement of the arm 201 that the latter's trip 201b or another part of the shutter means changes the position of the control switch 209b, one end of the resistor element 214 is connected directly with one pole of the battery 212 via contact 227 and closed master switch 215. At the same time, the capacitor 226 (which is in series with the resistor element 214) is charged through the resistor element because the third contact 229 opens when the contacts 227, 228 change their positions. The contact 228 then places the coil 207 into the emitter-collector circuit of the transistor 224.

The conductivity of transistors 223, 224 depends on voltage at the base of the transistor 223. When the third contact 229 of the control switch 209b leaves the position of FIG. 6, voltage att he base of the transistor 223 equals the voltage at the emitter so that the transistor 223 will be non-conducting. The transistor 224 conducts and the current flow through the coil 207 is close to the maximum obtainable from the battery 212. The capacitor 226 is charged at a rate which is a function of current flow through the resistor element 214 so that the base of transistor 223 becomes increasingly positive with respect to the emitter. When the voltage rises to a certain value, the transistor 223 becomes conductive and the conductivity of transistor 224 is terminated abruptly. The current ceases to flow through the coil 207 and the arm 201 follows the bias of its return spring 204 (FIG. 1) to overlie and conceal the opening 203.

An advantage of the circuit shown in FIG. 6 is seen to reside in that the exact moment when the plate 208 becomes separated from the electromagnet 206 can be selected with utmost accuracy. This is due to the fact that the flow of current through the coil 207 is terminated abruptly when the transistor 224 becomes non-conductive. Also, such movement of the plate 208 away from the electromagnet 206 is practically independent from minor fluctuations in the charge of the battery 212.

FIG. 7 illustrates a modified camera whose circuit constitutes a modification of the circuit shown in FIG. 6. In this camera, the rather complicated three-way control switch 209b can be replaced by a simple control switch 209 due to the provision of two electromagnets 231, 233 which respectively form part of the first and second retard means. The arm 201 carries a plate or portion 230 of magnetizable material which abuts against the core of the electromagnet 231 when the blade 202 overlies the diaphragm opening 203. The coil of the electromagnet 231 is shown at 232. When the blade 202 fully exposes the opening 203, the plate 230 abuts against the core of the electromagnet 233, the latter having a coil 234. Such extended or open position of the arm 201 and blade 202 is shown in FIG. 7 by broken lines. It is clear that the arm 201 could carry two magnetizable portions or plates each of which would cooperate with one of the electromagnets 231, 233.

Figure 8:
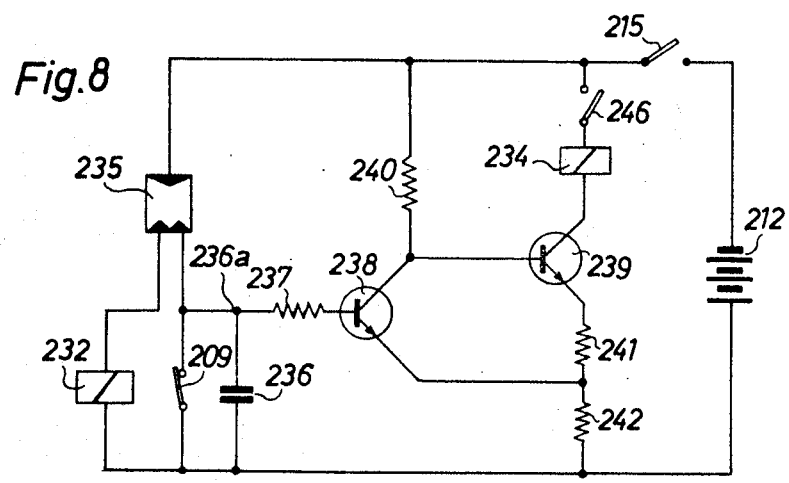
FIG. 8 illustrates circuit for the shutter means of the camera shown in FIG. 7.

The circuit of the just described camera is shown in FIG. 8. This circuit includes a differential light-sensitive resistor element 235 in series with the master switch 215. The coil 232 of the electromagnet 231 is connected between one pole of the battery 212 and one portion of the resistor element 235. Another portion of the element 235 is connected in series with the control switch 209 and in series with a capacitor 236. The control switch 209 is connected in parallel with the capacitor 236. One plate of the capacitor 236 is connected with one pole of the battery 212. It is clear that the differential resistor element 235 can be replaced by two separate light-sensitive resistor elements.

A tap 236a between the other portion of the resistor element 235 and capacitor 236 is connected with a fixed resistor 237 and through this resistor with the control electrode of a switching stage or circuit including two transistors 238, 239 and fixed resistors 240, 241, 242. The coil 234 of the electromagnet 233 is connected in the emitter-collector circuit of the transistor 239, and this coil is placed in series with an additional switch 246 which is normally open but can be closed by the projection 201a or another portion of the arm 201 or blade 202.

The operation is as follows:

The control switch 209 is normally closed. When the shutter release trigger 215b (see FIG. 2) is depressed and the intensity of scene light is weak, the trip 201b of the arm 201 will open the control switch 209 and the plate 230 will be attracted to the core of the electromagnet 233. A current flows through the coil 234 of electromagnet 233 because the voltage at the base and collector of the transistor 238 is substantially the same, i.e., the transistor 238 is non-conducting. The capacitor 236 is charged at a greater or lesser speed, depending on the intensity of scene light, until the condition of the switching stage (238–242) changes abruptly to interrupt the flow of current through the coil 234. The electromagnet 233 ceases to attract the plate 230 and arm 201 and the return spring 204 contracts to place the blade 202 into registry with the diaphragm opening 203.

When the intensity of scene light is high, the shutter of FIGS. 7 and 8 operates in the same way as described in connection with FIG. 1.

The additional switch 246 serves to achieve savings in electrical energy. As stated before, the switch 246 can be actuated by the trip 201b or by another part of the shutter means including the arm 201 and blade 202. The coil 234 will receive current only when the additional switch 246 is closed, i.e., when the arm 201 assumes the broken-line position of FIG. 7.

The core of the electromagnet 233 will attract the arm 201 only when the plate 230 moves very close to this electromagnet. In other words, concealment of diaphragm opening 203 by the blade 202 will be delayed only when the arm 201 moves well above its solid-line position. Therefore, the control switch 209 could be actuated by the release trigger 215b and/or by the impeller 210 so as to open in response to each depression of the trigger 215b irrespective of the length of the exposure time. This would not affect the exposures with short exposure times because the energization of electromagnet 233 is of very short duration when the intensity of scene light is high.

Figure 9:
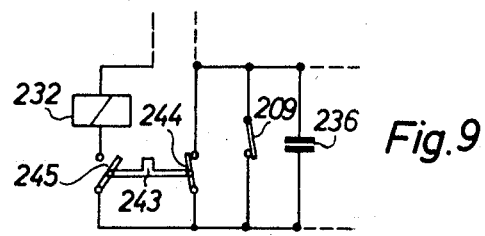
FIG. 9 illustrates a portion of a circuit constituting a modification of the circuit shown in FIG 8.

As shown in FIG. 9, the camera of FIGS. 7 and 8 can be provided with an actuating member 243 which closes a timer switch 244 and simultaneously locks in open position a normally closed interrupter switch 245 which is connected in series with the coil 232 of the electromagnet 231. The timer switch 244 is connected in parallel with the control switch 209. The actuating member 243 will be operated by hand when the user of the camera wishes to make an exposure with manual selection of the exposure time. The shutter means will remain open as long as the user continues to depress the release trigger because the electromagnet 231 (coil 232) is not energized and the electromagnet 233 attracts the plate 230 in fully open position of the shutter means. Instead of using the timer switch 244, the circuit of FIG. 9 could comprise an actuating member which would close the control switch 209 by simultaneously opening the interrupter switch 245.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a photographic camera, a combination comprising diaphragm means defining an opening; shutter means movable between open and closed positions to thereby respectively expose and conceal said opening; impeller means operative to propel said shutter means from closed toward a fully open position; return means for biasing said shutter means to closed position; and a plurality of retard means for delaying return movement of said shutter means to closed position as a function of scene brightness.

2. A combination as defined in claim 1, wherein one of said retard means comprises an electric circuit including electromagnet means energizable in response to operation of said impeller means, light-sensitive means for controlling the energization of said electromagnet means as a function of scene brightness so that the strength of the magnetic field of said electromagnet means is proportional to scene brightness, and a magnetizable portion provided on said shutter means to be attracted by said electromagnet means with a force which is proportional to the strength of said magnetic field and opposes the movement of shutter means from closed position.

3. A combination as defined in claim 2, wherein another of said retard means comprises control means connected in said circuit means and being actuated only in response to a predetermined displacement of said shutter means from closed position.

4. A combination as defined in claim 3, wherein said other retard means is arranged to oppose return movement of said shutter means to closed position with a force which is inversely proportional to scene brightness.

5. A combination as defined in claim 3, wherein said other retard means further comprises a second magnetizable portion provided on said shutter means, one of said portions being attracted by said electromagnet means in immediate response to operation of said impeller means to oppose movement of said shutter means toward fully open position and the other of said portions being attracted by said electromagnet means in response to operation of said control means to oppose return movement of said shutter means to closed position.

6. A combination as defined in claim 5, wherein said control means comprises a control switch actuatable by a trip which is movable with said shutter means and actuates said control switch in response to said predetermined displacement of said shutter means.

7. A combination as defined in claim 6, wherein said one retard means further comprises a normally open master switch in series with said light-sensitive means and a source of electrical energy, said other retard means further comprising capacitor means in parallel with said control switch, said control switch being normally closed and being opened by said trip in response to said predetermined displacement of said shutter means.

8. A combination as defined in claim 7, further comprising trigger means actuatable to operate said impeller means and additional trip means for closing said master switch in response to actuation of said trigger means.

9. A combination as defined in claim 8, wherein said other retard means further comprises a normally open delay switch connected in parallel with said master switch and arranged to close in response to said predetermined displacement of said shutter means irrespective of the position of said master switch until the displacement of said shutter means from closed position is less than said predetermined displacement.

10. A combination as defined in claim 3, wherein said one retard means further comprises a normally open master switch arranged to close in response to operation of said impeller means and a source of electrical energy connected in series with said master switch, said other retard means further comprising an R-C element connected in parallel with said electromagnet means and with said light-sensitive means, said control means comprising a control switch connected in series with said R-C element and arranged to change its position in response to said predetermined displacement of said shutter means from closed position to thereby effect discharge of said R-C element across said light-sensitive means and said electromagnet means.

11. A combination as defined in claim 3, wherein said one retard means further comprises a normally open master switch arranged to close in response to operation of said impeller means and a source of electrical energy connected in series with said master switch, with said light-sensitive means and with said electromagnet means, said other retard means further comprising capacitor means in series with said light-sensitive means and in parallel with said control means, said control means comprising a control switch having a pair of contacts normally connected with the poles of said source, one of said contacts being connected with a first tap between said electromagnet means and said light-sensitive means and the other contact being connected with a second tap between said source and said light-sensitive means in response to said predetermined displacement of said shutter means whereby said capacitor means is charged on closing of said master switch and discharges across said light-sensitive means and said electromagnet means in response to said predetermined displacement of said shutter means to delay return movement of said shutter means to closed position due to attraction between said electromagnet means and said magnetizable portion.

12. A combination as defined in claim 11, wherein said other retard means further comprises a switching stage having a control conductor connected with one of said taps.

13. A combination as defined in claim 12, wherein said control switch comprises a normally closed third contact connected in parallel with said capacitor means and arranged to open in response to said predetermined displacement of said shutter means.

14. A combination as defined in claim 3, wherein said other retard means comprises second electromagnet means arranged to attract said magnetizable portion with a force which is inversely proportional to scene brightness in response to said predetermined displacement of said shutter means.

15. A combination as defined in claim 14, wherein said one retard means further comprises a source of electrical energy connected in series with said light-sensitive means and a normally open master switch connected in series with said light-sensitive means and arranged to close in response to operation of said impeller means, said light-sensitive means comprising two resistor portions and said first mentioned electromagnet means being connected in series with one of said resistor portions, said other retard means further comprising a normally open additional switch connected in series with said second electromagnet means and arranged to close in response to movement of said shutter means from closed position.

16. A combination as defined in claim 15, wherein said other retard means further comprises a switching stage including a pair of transistors, and capacitor means in parallel with said control means and in series with the other resistor portion, said control means comprising a normally closed control switch arranged to open in response to said predetermined displacement of said shutter means.

17. A combination as defined in claim 16, wherein said shutter means comprises a trip arranged to close said additional switch on movement of said shutter means from closed position so that said additional switch closes simultaneously with opening of said control switch.

18. A combination as defined in claim 17, wherein said control switch is opened by said shutter means.

19. A combination as defined in claim 16, further comprising normally closed interrupter switch means in series with said first mentioned electromagnet means and manually operable actuating means for maintaining said control switch in closed position and for simultaneously opening said interrupter switch means.

20. A combination as defined in claim 16, further comprising a timer switch in parallel with said control switch, a normally closed interrupter switch in series with said first mentioned electromagnet means, and manually operable actuating means for maintaining said timer switch in closed position and for simultaneously opening said interrupter switch.

21. A combination as defined in claim 2, further comprising means for maintaining said shutter means in open position independently of said retard means.

22. A combination as defined in claim 2, wherein another of said retard means is arranged to delay the return movement of said shutter means to closed position when the intensity of scene light is below a predetermined value.

23. A combination as defined in claim 22, wherein said other retard means comprises electrical components connected in said circuit means.

24. A combination as defined in claim 22, wherein said electromagnet means is arranged to be energized by said other retard means when the intensity of scene light is below said predetermined value and wherein said magnetizable portion is then attracted by said electromagnet means.

References Cited

UNITED STATES PATENTS

| | | | |
|---|---|---|---|
| 2,887,938 | 5/1959 | Nassour et al. | 95—53 |
| 2,952,198 | 9/1960 | Fuerst | 95—62 |

NORTON ANSHER, *Primary Examiner.*

J. F. PETERS, JR., *Assistant Examiner.*